United States Patent

[11] 3,581,628

[72] Inventor Thomas V. Williams
 415 Dreshertown Road, Fort Washington, Pa. 19034
[21] Appl. No. 882,243
[22] Filed Dec. 4, 1969
[45] Patented June 1, 1971

[54] INHERENTLY BALANCED RECIPROCATING POWER PLANT
 9 Claims, 10 Drawing Figs.
[52] U.S. Cl.................................................. 92/73,
 123/52, 123/52A, 123/192
[51] Int. Cl.............................................. F01b 1/02
[50] Field of Search........................................ 92/73, 72,
 146, 147, 7; 123/52, 52 A, 53 AL, 192RAL, 197 ME

[56] References Cited
UNITED STATES PATENTS

| | | | | |
|---|---|---|---|---|
| 1,205,895 | 11/1916 | Hoyt.............................. | | 123/192 |
| 1,241,999 | 10/1917 | Learned....................... | | 123/53 |
| 1,640,889 | 8/1927 | Dieter........................... | | 123/52 |
| 2,596,410 | 5/1952 | Jordan........................... | | 123/52 |
| 3,384,058 | 5/1958 | Kiekhaefer et al............ | | 123/52 |

Primary Examiner—Martin P. Schwadron
Assistant Examiner—Leslie J. Payne
Attorney—Seidel, Gonda and Goldhammer ABSTRACT: A reciprocating powerplant is disclosed wherein cylinders are disposed in groups of four, with cylinders in each group disposed in side-by-side relation in two parallel rows. Crankshafts associated with the respective rows are parallel and are interconnected for counterrotation, and have cranks so disposed that the pistons in diagonally adjacent cylinders in the respective groups and rows move in the same direction and are at corresponding positions in their travel at any given time.

Patented June 1, 1971

INVENTOR
THOMAS V. WILLIAMS
BY
Seidel, Gonda & Goldhammer
ATTORNEYS.

Patented June 1, 1971

INVENTOR
THOMAS V. WILLIAMS
BY
Seidel, Gonda & Goldhammer
ATTORNEYS.

INHERENTLY BALANCED RECIPROCATING POWER PLANT

This invention is directed to an inherently balanced reciprocating powerplant, and more particularly, to a reciprocating powerplant using an arrangement of cylinders and a pair of parallel crankshafts such that the primary and secondary forces and moments are inherently balanced.

It is well known that movement of the reciprocating and rotating parts of reciprocating machines, such as internal combustion engines or fluid motors, may cause vibration due to unbalanced forces and moments. As a practical matter, designers of such machines concern themselves with primary forces, alternating once per crankshaft revolution, and secondary forces, alternating twice per revolution. Forces of higher frequency, although they do occur, are of such a magnitude and frequency that they can be and are ignored.

Some well-known engine configurations are inherently balanced in primary and secondary forces, as well as primary and secondary moments. For example, the conventional six-cylinder inline engine, using a 0–120–240–120–0 crank arrangement is in primary and secondary force balance, and balanced for primary and secondary moments. An eight-cylinder inline engine having a 0–180–90–270–270–90–180–0 crank arrangement is similarly balanced. A V-12 arrangement, frequently used in large diesel engines, and once popular in aircraft engines, is inherently balanced, since each of its six-cylinder banks is so balanced.

The widely used V-8 engine is balanced if the respective cylinder banks are disposed at an angle of 90° with respect to each other. Thus, assuming the use of a 0–90–270–180 crank arrangement, which in a four-cylinder inline engine yields unbalanced primary moments, the 90° V cylinder arrangement achieves perfect balance by aligning the oppositely directed longitudinal and lateral unbalances of each of the individual cylinder banks.

The present invention is directed to reciprocating power plant wherein the cylinders, the total number of which is a multiple of four, are arranged in parallel rows and side-by-side relation, and the pistons coupled to counterrotating crankshafts having cranks such that pistons in diagonally adjacent cylinders in the respective rows move in the same direction and are at corresponding positions in their level at any given time, while successive cranks in the same shaft and within the same group of four cylinders are offset from each other by 180°. As used herein, it should be pointed out, "diagonally adjacent" is intended to mean any given cylinder numbered "$n$" in one of the rows, and the cylinder numbered "$n+1$" in the other row and in the same group.

The above-mentioned four-cylinder group, it should be understood, can form the basic unit or "module" for a powerplant having larger numbers of cylinders. For example, 8, 12, 16 or more cylinders can be used, without loss of the inherent balance characteristic of the basic unit. Moreover, the side-by-side relation of the cylinders of the present powerplant yields a short, relatively compact unit, for a given number of cylinders.

In view of the foregoing, it is an object of this invention to provide an inherently balanced reciprocating powerplant.

It is another object to provide an inherently balanced reciprocating powerplant wherein the cylinders are disposed in parallel rows in side-by-side relation, each of the rows being associated with an individual crankshaft.

It is another object to provide an inherently balanced reciprocating powerplant wherein the cylinders are disposed in groups of four, and in parallel rows in side-by-side relation, the relative positions at any given time of the pistons associated with the respective cylinders being such that the powerplant is inherently in primary and secondary force balance, and balanced for primary and secondary moments.

Other objects will appear hereinafter.

The foregoing and other objects are accomplished, in a presently preferred form of the apparatus, by a reciprocating powerplant having cylinders arranged in groups of four, and in parallel rows with like-numbered cylinders in each row side-by-side relation. Individual crankshafts associated with the respective rows are interconnected for counterrotation, and have cranks thereon so disposed that pistons in diagonally adjacent cylinders in each group move in the same direction and are at like positions in their travel at a given time.

For the purpose of illustrating the invention, there are shown in the drawings forms which are presently preferred; it being understood, however, that this invention is not limited to the precise arrangements and instrumentalities shown.

Figure 1:
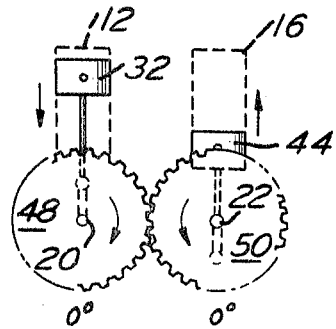
FIG. 1 is a diagrammatic front elevation view showing various components of a powerplant in accordance with the invention at one point in their cycles of operation.

Referring now to the drawings in detail, wherein like numerals indicate like elements, there is seen in FIGS. 2 to 6 and 8 in diagrammatic form, a four-cylinder powerplant designated generally by the reference numeral 10, constructed in accordance with the present invention.

The powerplant 10 includes cylinders 12, 14, 16 and 18, arranged in parallel rows. Thus, the cylinder 14 is disposed directly behind the cylinder 12, and the cylinder 18 is directly behind the cylinder 16.

The cylinders 12 and 16, which may be considered the first cylinders in their respective rows, are in side-by-side relation. Also, the cylinders 14 and 18, the second cylinders in their respective rows, are in side-by-side relation.

Figure 9:
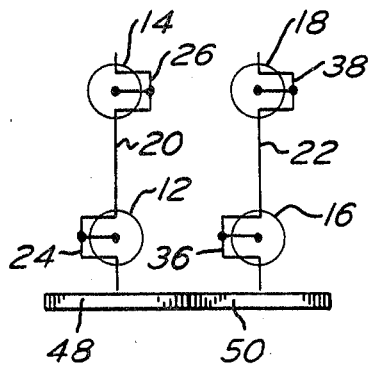
FIG. 9 is a diagrammatic top plan view showing the disposition of the cranks at the point in the cycle of operation depicted in FIGS. 7 and 8.

The relative positions of the cylinders 12, 14, 16 and 18 is perhaps best seen in FIG. 9, a diagrammatic top plan view.

Individual crankshafts 20 and 22 are associated with the respective rows of cylinders. Thus, the crankshaft 20 is disposed in a crankcase, not shown, in alignment with the respective cylinders 12 and 14. The crankshaft 22 is disposed in the crankcase in alignment with the cylinders 16 and 18.

Cranks 24 and 26 of the crankshaft 20 receive the lower ends of connecting rods 28 and 30, the upper ends of such rods being pivotably coupled to pistons 32 and 34 slidable within the cylinders 12 and 14, respectively.

Similarly, cranks 36 and 38 of the crankshaft 22 receive lower ends of connecting rods 40 and 42, the upper ends of which are coupled to pistons 44 and 46 slidable within the cylinders 16 and 18, respectively.

As is apparent from FIGS. 1, 3, 5 and 7, the respective crankshafts 20 and 22 are interconnected for counterrotation, for example, by interengaged gears 48 and 50.

The cranks 24 and 26 are angularly displaced from each other by 180°. The cranks 36 and 38 are similarly displaced from each other. Thus, when the piston 32 is at its top dead center position, the piston 34 is at bottom dead center. Similarly, when the piston 44 is at bottom dead center the piston 46 is at top dead center.

The crankshafts 20 and 22 are so interconnected by the gears 48 and 50 that the cranks 26 and 36 arrive at their top and bottom dead center positions simultaneously. Similarly, due to the configurations of the crankshafts 20 and 22, the cranks 24 and 38 arrive at their top and bottom dead center positions simultaneously. Assuming, therefore, that the cranks 24, 26, 36, 38 are of equal throw, and the connecting rods 28, 30, 40 and 42 are of equal lengths, the pistons 34, 44 and 32, 46 in "diagonally adjacent" cylinders occupy like positions in their travel at any given time. The respective pairs of diagonally adjacent pistons, due to the configuration of the crankshafts 20 and 22, move in the opposite sense from each other. The result is perfect balancing of primary and secondary forces and moments.

The travel of the pistons 32, 34 and 44 and 46 through a complete rotation of the crankshafts 20 and 22 will now be described in detail.

Figure 2:
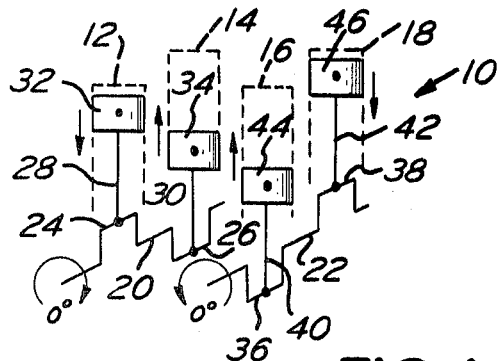
FIG. 2 is a diagrammatic perspective view, showing the various components of a powerplant at points in their cycles of operation corresponding to those of the components shown in FIG. 1.

Referring to FIGS. 1 and 2 wherein the crankshafts 20 and 22 occupy a position which may be described for convenience as a "0°" position, the piston 32 is at top dead center, and the piston 44 at bottom dead center. The piston 34, due to the location of the crank 26 with which it is associated, is at bottom dead center, and the piston 46 is at top dead center.

Figure 3:
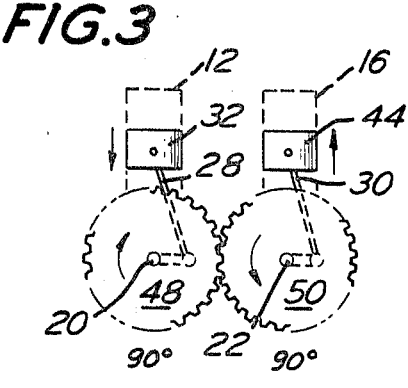
FIG. 3 is a diagrammatic front elevation view showing the components seen in FIG. 1 at another point in their cycle of operation.
Figure 4:
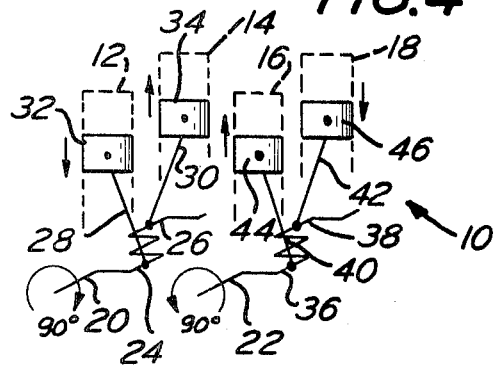
FIG. 4 is a diagrammatic perspective view, similar to FIG. 2, showing the various components of the powerplant at a point in their respective cycles of operation corresponding to the positions of the components shown in FIG. 3.

Referring to FIGS. 3 and 4, the crankshaft 20 and 22 are seen after 90° of rotation from their positions in FIGS. 1 and 2.

Pistons 32 and 46 have started downwardly in their travel from their former positions, while pistons 34 and 44 are in their up stroke. In the position seen in FIGS. 3 and 4, it should be noted, all of the pistons 32, 34, 44 and 46 are at the same relative positions within their respective cylinders 12, 14, 16, 18.

Figure 5:
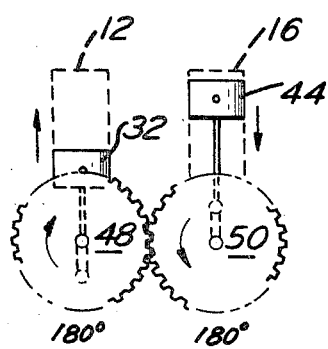
FIG. 5 is a diagrammatic front elevation view showing the various components seen in FIG. 1 at yet another point in their cycles of operation.
Figure 6:
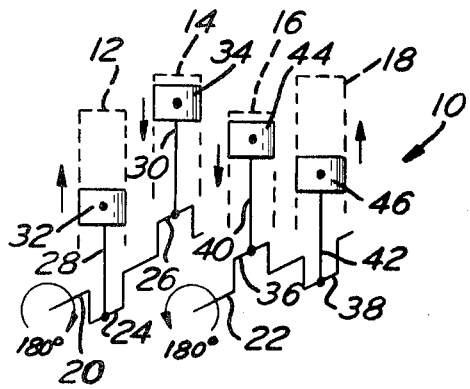
FIG. 6 is a diagrammatic perspective view, showing the various components in positions corresponding to the positions of the components shown in FIG. 5.

Referring to FIGS. 5 and 6, the crankshafts 20 and 22 are depicted after rotation through 180° from the pistons in FIGS. 1 and 2.

The pistons 32 and 46 have arrived at their bottom dead center positions, and pistons 34 and 44 are at top dead center.

Figure 7:
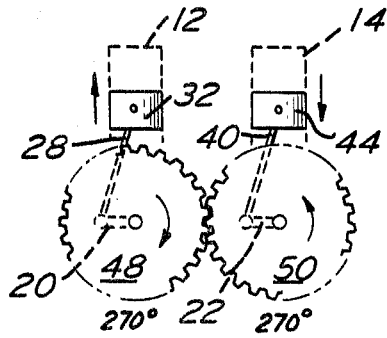
FIG. 7 is a diagrammatic front elevation view showing the various components seen in FIG. 1 at still another point in their cycles of operation.
Figure 8:
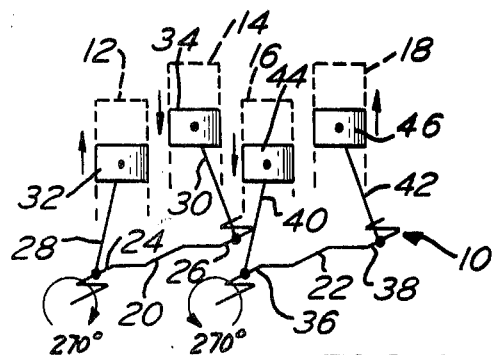
FIG. 8 is a diagrammatic perspective view, showing the various components of the powerplant at positions corresponding to the positions of the components in FIG. 7.

In FIGS. 7 and 8, the crankshafts 20 and 22 are depicted in a position of rotation 270° from the position in FIGS. 1 and 2. The pistons 32 and 46 are approaching the mid points of their upstrokes, while the pistons 34 and 44 are in their down strokes.

FIG. 9 is a further illustration of the position of the crankshafts 20 and 22 in FIGS. 7 and 8. The cranks 24 and 36 associated with the first cylinders (12 and 16) of each row lie in similar positions, offset to the left in FIG. 9. The cranks 26 and 38 associated with the second cylinders (14 and 18) in each row lie in similar positions, offset to the right in FIGS. 9. The crankshafts 20 and 22, it should be understood, are counterbalanced in the usual manner, the counterbalances not being shown, and interconnected by gears 48 and 50. Hence, there are not external forces or couples attributable to the rotating mass of the cranks 24, 26, 36 and 38 and the ends of the connecting rods 28, 30, 40 and 42 associated therewith.

Figure 10:
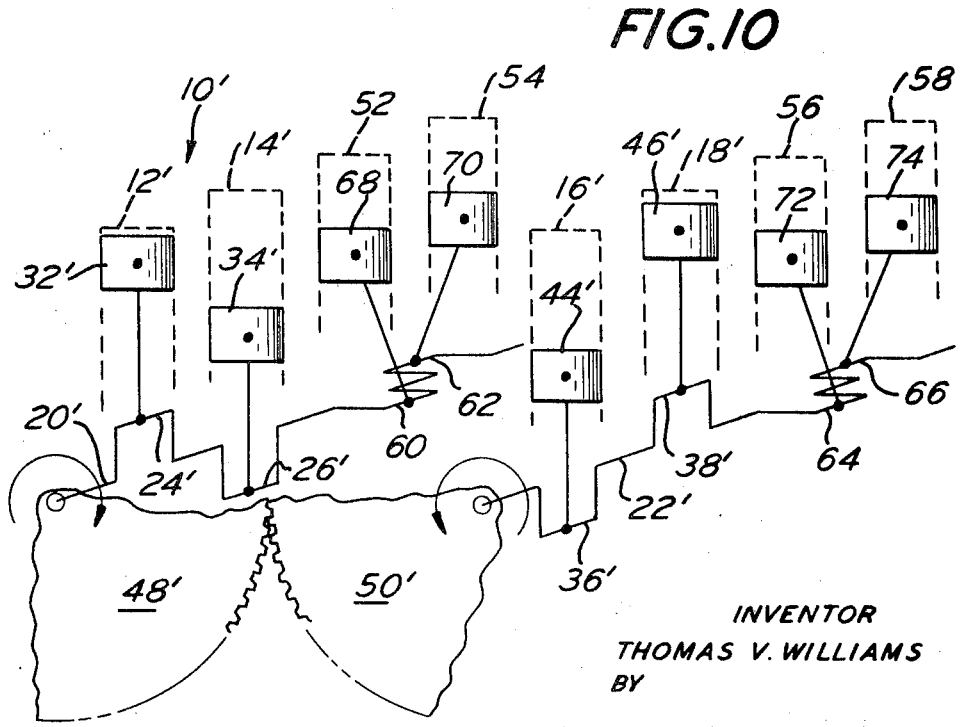
FIG. 10 is a diagrammatic perspective view of a modified form of a powerplant in accordance with the invention, with eight cylinder rather than four.

Referring now to FIG. 10, there is seen a modified form of the invention, wherein elements corresponding to those previously described are designated by like primed numerals.

Thus, the powerplant 10' seen in FIG. 10 includes cylinders 12', 14', 52 and 54 forming one row of cylinders, and 16', 18', 56 and 58 forming another, parallel row. Like numbered cylinders in the respective rows are in side-by-side relation, and the cylinders 12'–18' and 52–58 constitute respective balanced four-cylinder groups.

Associated with the cylinders 12' 14', 52 and 54 is a crankshaft 20', which includes cranks 24', 26', 60 and 62. Associated with the cylinders 16', 18', 56 and 58 is a crankshaft 22', parallel to the crankshaft 20', and having cranks 36', 38', 64 and 66.

The crankshafts 20' and 22' are interconnected for counterrotation by gears 48' and 50'. The movement of the pistons 32', 34', 44' and 46', and their associated cranks 24', 26', 36' and 38' is in all respects similar to that of the corresponding elements of the above-described powerplant 10.

The cranks 60 and 62 of the crankshaft 20', it will be noted, lie in a common plane, in this instance angularly offset by 90° from the common plane in which the cranks 24' and 26' lie. Similarly, the cranks 64 and 66 of the crankshaft 22' lie in a common plane, angularly offset from a plane containing the cranks 36' and 38' by 90°. The movement of pistons 68, 70, 72 and 74, associated with the respective cylinders 52, 54, 56 and 58 and cranks 60, 62, 64 and 66 is analogous to that of the pistons 32', 34', 44' and 46'. Thus, the "diagonally adjacent" pistons 70 and 72 travel in a like sense and are at similar points in their travel at any given time, as are the pistons 68 and 74. Moreover, pistons 68 and 74 are bottom dead center when the pistons 70 and 72 are at top dead center. Thus, for the purpose of analysis, the cylinders 52, 54, 56 and 58 and their associated machinery can be considered a second "module" of four cylinders, and the primary and secondary forces and couples associated with such modules are inherently balanced. Thus, the entire powerplant 10' is inherently balanced.

Although the powerplant 10' is shown with eight cylinders, it should be understood that other numbers of cylinders which are multiples of the basic four-cylinder "module" may be used. Thus, the principles of the present invention may be applied to engines of 12, 16 or more cylinders.

The illustrated crankshaft 20' has what may be referred to as the 0–180–90–270 configuration. The crankshaft 22' has a 180–0–90–270 configuration. Thus, in the crankshafts 20' and 22', the respective cranks 60 and 64 associated with the first cylinders 52, 56 of the second group in each row are angularly offset by 270° in the direction of rotation of their crankshafts from the cranks 26', 38', next preceding them. It should be understood that other crankshaft configurations may be used. For example, a practical balanced engine having eight cylinders may use respective 0–180–180–0 and 180–0–0–180 crankshafts, or others, so long as diagonally adjacent pistons in the respective groups move in the same sense and are at corresponding locations in their travel at all times.

The present invention may be embodied in other specific forms without departing from the spirit or essential attributes thereof.

I claim:

1. A reciprocating powerplant having cylinders arranged in groups of four, respective cylinders in such groups being disposed in a pair of parallel rows with corresponding cylinders in respective rows being in side-by-side relation, pistons disposed for reciprocation in said cylinders, individual crankshafts operatively associated with the respective rows and having cranks thereon coupled to said pistons, said crankshafts being interconnected for counterrotation and having said cranks thereon so disposed that pistons in diagonally adjacent cylinders in each group move in the same direction and are at like positions in their travel at any given time.

2. A reciprocating powerplant in accordance with claim 1 having four cylinders, successive cranks in each of said crankshafts being angularly offset from each other by 180° so that the pistons in successive cylinders in each row are disposed at top dead center and bottom dead center simultaneously.

3. A reciprocating powerplant in accordance with claim 1 having a total number of cylinders which is a multiple of four, each of said crankshafts having successive pairs of cranks, the successive individual cranks in each of said pairs being angularly offset from each other by 180° so that the pistons in successive cylinders in each row are disposed at top dead center and bottom dead center simultaneously.

4. A reciprocating powerplant in accordance with claim 1 having eight cylinders, each of said crankshafts having first and second successive cranks angularly offset from each other by 180° so that the pistons in the first and second successive cylinders in each row are disposed at top dead center and bottom dead center simultaneously, and each of said crankshafts having third and fourth successive cranks angularly offset from each other by 180°.

5. A reciprocating powerplant in accordance with claim 4, wherein said third and fourth successive cranks lie in a plane disposed at right angles to a plane containing the first and second successive cranks.

6. A reciprocating powerplant in accordance with claim 5, wherein the third successive crank of each crankshaft is angularly offset from the second crank by an angle of 270° in the direction of rotation of such crankshaft.

7. A reciprocating powerplant in accordance with claim 6, wherein one of said crankshafts has a 0-180-90-270 crank configuration, and the other has a 180-0-90-270 crank configuration.

8. A reciprocating powerplant in accordance with claim 1, wherein each of said crankshafts has successive cranks arranged in groups of two, the individual cranks of each group being angularly offset from each other by 180°.

9. A reciprocating powerplant in accordance with claim 8, wherein each group lies in a plane disposed at right angles to a plane containing the cranks of an adjacent group.